United States Patent
Ko et al.

(10) Patent No.: US 9,736,840 B2
(45) Date of Patent: Aug. 15, 2017

(54) COMMUNICATION METHOD AND RESOURCE ASSIGNING METHOD BETWEEN A PLURALITY OF TERMINALS IN INFRASTRUCTURE NETWORK

(75) Inventors: Gwang Zeen Ko, Daejeon (KR); Sung Jin Yoo, Daejeon (KR); Jin Suk Pak, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 84 days.

(21) Appl. No.: 14/357,316

(22) PCT Filed: Aug. 6, 2012

(86) PCT No.: PCT/KR2012/006232
§ 371 (c)(1),
(2), (4) Date: May 9, 2014

(87) PCT Pub. No.: WO2013/069876
PCT Pub. Date: May 16, 2013

(65) Prior Publication Data
US 2014/0341178 A1 Nov. 20, 2014

(30) Foreign Application Priority Data
Nov. 9, 2011 (KR) .......................... 10-2011-0116449
Jul. 5, 2012 (KR) .......................... 10-2012-0073129

(51) Int. Cl.
*H04W 72/04* (2009.01)
*H04W 74/08* (2009.01)

(52) U.S. Cl.
CPC ........ *H04W 72/0453* (2013.01); *H04W 74/08* (2013.01)

(58) Field of Classification Search
CPC ........................... H04W 72/0453; H04W 74/08
See application file for complete search history.

(56) References Cited

U.S. PATENT DOCUMENTS

| 2008/0232320 A1* | 9/2008 | Lee ........................ H04W 16/10 370/329 |
| 2009/0054009 A1* | 2/2009 | Yang ..................... H04W 16/14 455/78 |
| 2009/0067448 A1* | 3/2009 | Stanwood ............. H04L 12/413 370/447 |

(Continued)

FOREIGN PATENT DOCUMENTS

| JP | 2012-095092 A * | 5/2012 | ............ H04W 72/04 |
| KR | 1020080047001 A | 5/2008 | |

(Continued)

*Primary Examiner* — Xavier Szewai Wong
(74) *Attorney, Agent, or Firm* — William Park & Associates Ltd.

(57) ABSTRACT

A communication method between a plurality of terminals and a resource allocation method in an infrastructure network are disclosed. A terminal according to an embodiment communicates with at least one other terminal using a particular frequency band in a third time section distinguished from a first time section for reception of a downlink data and a second time section for transmission of an uplink data, thereby providing a technology of generating a small-scale network partly with respect to a particular region in a network with an extensive coverage of an infrastructure network.

7 Claims, 12 Drawing Sheets

(56) References Cited

U.S. PATENT DOCUMENTS

| | | | |
|---|---|---|---|
| 2009/0221325 A1 | 9/2009 | Periyalwar et al. | |
| 2010/0296436 A1* | 11/2010 | Kwon | H04J 13/0059 370/328 |
| 2012/0257654 A1* | 10/2012 | Gilberton | H04W 72/1215 375/219 |
| 2012/0300662 A1* | 11/2012 | Wang | H04W 72/02 370/252 |

FOREIGN PATENT DOCUMENTS

| | | |
|---|---|---|
| KR | 1020090005676 A | 1/2009 |
| KR | 1020090062435 A | 6/2009 |
| KR | 1020100090789 A | 8/2010 |
| KR | 1020110119555 A | 11/2011 |
| WO | 2009067389 A1 | 5/2009 |

* cited by examiner

COMMUNICATION METHOD AND RESOURCE ASSIGNING METHOD BETWEEN A PLURALITY OF TERMINALS IN INFRASTRUCTURE NETWORK

TECHNICAL FIELD

The present invention relates to a communication method of a terminal and a resource allocation method of a base station for communication between a plurality of terminals in an infrastructure network including the base station and the plurality of terminals.

BACKGROUND ART

Conventional network architecture manages a network in an infrastructure mode or an ad-hoc mode.

The infrastructure mode is a communication method which includes a base station to centrally manage an entire network and a terminal to access the base station and conduct communication using a communication link to the base station. The infrastructure mode is used to provide a communication service to a relatively large area.

The ad-hoc mode is a communication method in which a plurality of terminals having the same function exchange control signals with each other to build a communication network. The ad-hoc mode has been used to build a communication network in a comparatively small area.

In the ad-hoc mode, the terminals are generally required to support similar types of terminal functions, because all terminals need to have control functions throughout the network.

Conversely, in the infrastructure mode covering a wide area, the base station may have more functions than the terminals to perform primary control functions over the entire network, and thus the terminals may be relatively simple. Further, with regard to transmitted power, a directional antenna directed towards the base station may be used, and thus a network may cover a large area with low power consumption.

DISCLOSURE OF INVENTION

Technical Solutions

According to an aspect of the present invention, there is provided a communication method of a terminal for communication between a plurality of terminals in an infrastructure network including a base station and the plurality of terminals, the communication method including receiving a downlink data from the base station using a particular frequency band in a first time section, transmitting an uplink data to the based station using the particular frequency band in a second time section distinguished from the first time section, and communicating with at least one other terminal using the particular frequency band in a third time section distinguished from the first time section and the second time section.

Here, the communicating with the at least one other terminal may include communicating with the base station in the third time section using a first frequency band, and communicating with the at least one other terminal in the third time section using a second frequency band distinguished from the first frequency band, and the particular frequency band may include the first frequency band and the second frequency band.

Further, the communicating with the at least one other terminal may include receiving data from the at least one other terminal using the particular frequency band in a predetermined fourth time section, and transmitting data to the at least one other terminal using the particular frequency band in a predetermined fifth time section, and the third time section may include the fourth time section and the fifth time section, and the fifth time section may be distinguished from the fourth time section.

Further, the communicating with the at least one other terminal may include communicating with the at least one other terminal using the particular frequency band in the third time section in a random access mode.

Further, the communicating with the at least one other terminal may include receiving data from the at least one other terminal using the particular frequency band in a predetermined fourth time section, transmitting data to the at least one other terminal using the particular frequency band in a predetermined fifth time section, and communicating with the at least one other terminal using the particular frequency band in a predetermined sixth time section in a random access mode, the third time section may include the fourth time section, the fifth time section, and the sixth time section, the fifth time section may be distinguished from the fourth time section, and the sixth time section may be distinguished from the fourth time section and the fifth time section.

According to an aspect of the present invention, there is provided a communication method of a terminal for communication between a plurality of terminals in an infrastructure network including a base station and the plurality of terminals, the communication method including receiving a downlink data from the base station in a particular time section using a first frequency band, transmitting an uplink data to the based station in the particular time section using a second frequency band distinguished from the first frequency band, and communicating with at least one other terminal in the particular time section using a third frequency band distinguished from the first frequency band and the second frequency band.

Here, the communicating with the at least one other terminal may include communicating with the base station using the third frequency band in a first time section, and communicating with the at least one other terminal using the third frequency band in a second time section distinguished from the first time section, and the particular time section may include the first time section and the second time section.

According to an aspect of the present invention, there is provided a communication method of a terminal for communication between a plurality of terminals in an infrastructure network including a base station and the plurality of terminals, the communication method including receiving resource allocation information for communication with at least one other terminal from the base station, determining whether to communicate with the at least one terminal based on the resource allocation information, and communicating with the base station or the at least one terminal based on the resource allocation information and a determination result, wherein the resource allocation information includes information about a first time section for reception of downlink data from the base station using a particular frequency band, information about a second time section for transmission of uplink data to the base station using the particular frequency band, the second time section being distinguished from the first time section, and information about a third time section for communication with the at least one terminal using the particular frequency band, the third time section being distinguished from the first time section and the second time section.

Here, the information about the third time section may include information about a first frequency band for communication with the base station in the third time section, the first frequency band being included in the particular frequency band, and information about a second frequency band for communication with the at least one terminal in the third time section, the second frequency band being included in the particular frequency band and distinguished from the first frequency band.

According to an aspect of the present invention, there is provided a communication method of a terminal for communication between a plurality of terminals in an infrastructure network including a base station and the plurality of terminals, the communication method including receiving resource allocation information for communication with at least one other terminal from the base station, determining whether to communicate with the at least one terminal based on the resource allocation information, and communicating with the base station or the at least one terminal based on the resource allocation information and a determination result, wherein the resource allocation information includes information about a first frequency band for reception of downlink data from the base station in a particular time section, information about a second frequency band for transmission of uplink data to the base station in the particular time section, the second frequency band being distinguished from the first frequency band, and information about a third frequency band for communication with the at least one terminal in the particular time section, the third frequency band being distinguished from the first frequency band and the second frequency band.

Here, the information about the third frequency band may include information about a first time section for communication with the base station using the third frequency band, the first time section being included in the particular time section, and information about a second time section for communication with the at least one terminal using the third frequency band, the second time section being included in the particular time section and distinguished from the first time section.

According to an aspect of the present invention, there is provided a resource allocation method of a base station in an infrastructure network including the base station and a plurality of terminals, one super frame including a downlink resource, an uplink resource, and a terminal-to-terminal communication resource, the resource allocation method including allocating the downlink resource for downlink communication from the base station to at least one terminal among the plurality of terminals in the super frame, allocating the uplink resource for uplink communication from the at least one terminal among the plurality of terminals to the base station in the super frame, and allocating the terminal-to-terminal communication resource for communication between the plurality of terminals in the super frame.

The resource allocation method may further include acquiring information about traffic between the plurality of terminals, and determining whether to allocate the terminal-to-terminal communication resource based on the information about the traffic, wherein the allocating the downlink resource, the allocating the uplink resource, and the allocating the terminal-to-terminal communication resource may be based on a determination result.

Here, the plurality of terminals may include a first terminal and a second terminal, and the allocating the terminal-to-terminal communication resource may include allocating a first terminal communication resource for communication from the first terminal to the second terminal, and allocating a second terminal communication resource for communication from the second terminal to the first terminal.

Here, the plurality of terminals may communicate with each other using the terminal-to-terminal communication resource in a random access mode.

Here, the plurality of terminals may include a first terminal and a second terminal, and the allocating the terminal-to-terminal communication resource may include allocating a first terminal communication resource for communication from the first terminal to the second terminal, allocating a second terminal communication resource for communication from the second terminal to the first terminal, and allocating a third terminal communication resource for communication between the first terminal and the second terminal in a random access mode.

Advantageous Effects

Embodiments may provide a method of generating a small-scale network partly with respect to a particular region in a network with an extensive coverage of an infrastructure network.

That is, embodiments may provide a method of expanding a function of a conventional base station-terminal communication mode to support a terminal-to-terminal communication mode.

Further, embodiments may provide a method of supporting communication between different kinds of terminals, thereby differentially managing different types of terminals based on required performances thereof.

In addition, embodiments may provide a method of supporting an additional communication link through a relay using terminal-to-terminal communication in an area where direct communication between a base station and a terminal is impossible.

BEST MODE FOR CARRYING OUT THE INVENTION

Figure 1:
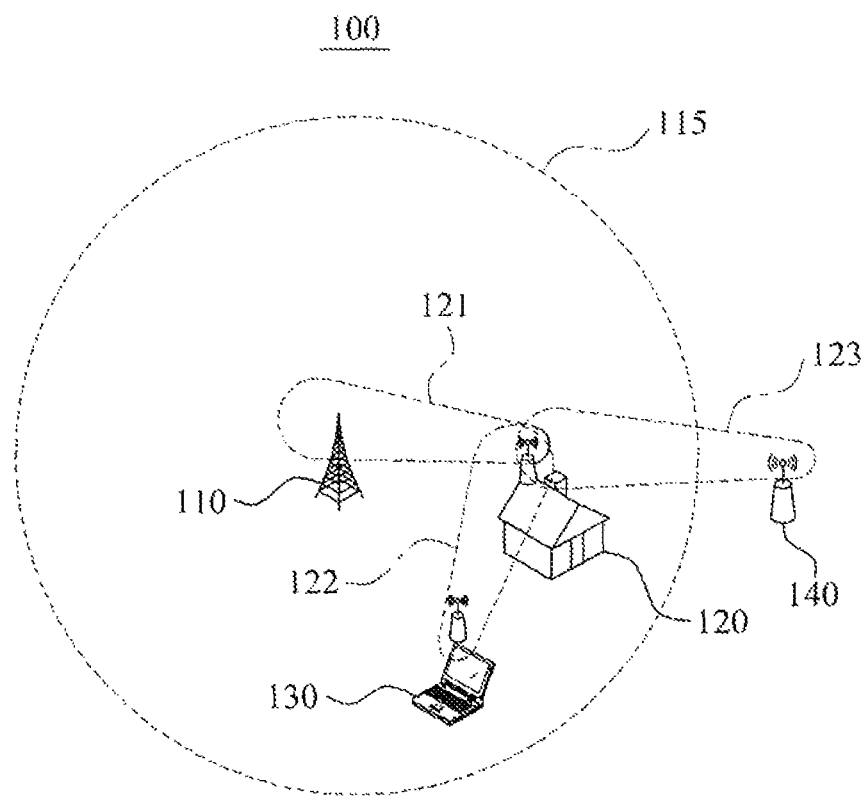
FIG. 1 illustrates communication between a plurality of terminals in an infrastructure network according to an embodiment.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates communication between a plurality of terminals in an infrastructure network according to an embodiment.

Referring to FIG. 1, the infrastructure network 100 according to the present embodiment includes a base station 110 and a plurality of terminals 120, 130 and 140.

Here, the infrastructure network 100 may provide not only a channel 121 for base station-to-terminal communication but also channels 122 and 123 for terminal-to-terminal communication.

In detail, the infrastructure network 100 may provide the channel 121 for base station-to-terminal communication to support communication between the terminal 120 positioned in a communication range 115 of the base station and the base station 110.

That is, the infrastructure network 100 may expand a function of a conventional base station-terminal communication mode to support a terminal-terminal communication mode.

In addition, the infrastructure network 100 may provide the channels 122 and 123 for terminal-to-terminal communication to support communication between the terminal 120 positioned in the communication range 115 of the base station and other adjacent terminals 130 and 140.

Here, the channel 121 for base station-to-terminal communication and the channels 122 and 123 for terminal-to-terminal communication provided by the infrastructure network 100 are independent from each other.

For example, the channel 121 for base station-to-terminal communication and the channels 122 and 123 for terminal-to-terminal communication may use different time sections or different frequency bands. The channel 121 for base station-to-terminal communication and the channels 122 and 123 for terminal-to-terminal communication will be described in detail with reference to FIGS. 2 to 12.

Here, the plurality of terminals 120, 130 and 140 according to the present embodiment may include terminals 120 and 130 positioned within the communication range 115 of the base station and a terminal 140 positioned outside the communication range 115 of the base station.

In this case, the infrastructure network 100 may provide the channel 121 for terminal-to-terminal communication to support communication between the terminals 120 and 130 positioned within the communication range 115 of the base station.

Further, the infrastructure network 100 may provide the channel 123 for terminal-to-terminal communication to support communication between the terminals 120 and 140 positioned within and outside the communication range 115 of the base station, respectively.

That is, the terminal 120 may communicate with the other adjacent terminals 130 and 140 directly, rather than via the base station 110. For example, the terminal 120 may communicate with the terminal 130 using the channel 122 for terminal-to-terminal communication or with the terminal 140 using the channel 123 for terminal-to-terminal communication.

Further, the base station 110 according to the present embodiment may communicate with the terminals 120 and 130 positioned within the communication range 115. For example, the base station 110 may communicate with the terminal 120 using the channel 121 for base station-to-terminal communication.

In addition, the base station 110 may communicate with the terminal 140 positioned outside the communication range 115 of the base station through the terminal 120 positioned within the communication range 115 of the base station. For example, the base station 110 may communicate with the terminal 140 using the channel 121 for terminal-to-terminal communication and the terminal and the channel 123 for terminal-to-terminal communication.

That is, the infrastructure network 100 according to the present embodiment may provide an additional communication link through a relay using terminal-to-terminal communication in an area where direct communication between the base station and a terminal is impossible.

Further, the plurality of terminals 120, 130, and 140 may be different types of terminals, respectively. For example, the terminal 120 may be a terminal for a home network service, the terminal 130 may be a personal computer terminal, and the terminal 140 may be a mobile terminal.

That is, the infrastructure network 100 according to the present embodiment supports communications between different kinds of terminals. Accordingly, the infrastructure network 100 may differentially manage different types of terminals based on required performances thereof.

FIGS. 2 to 6 illustrate a terminal communicating with at least one other terminal in a third time section according to embodiments.

Figure 2:
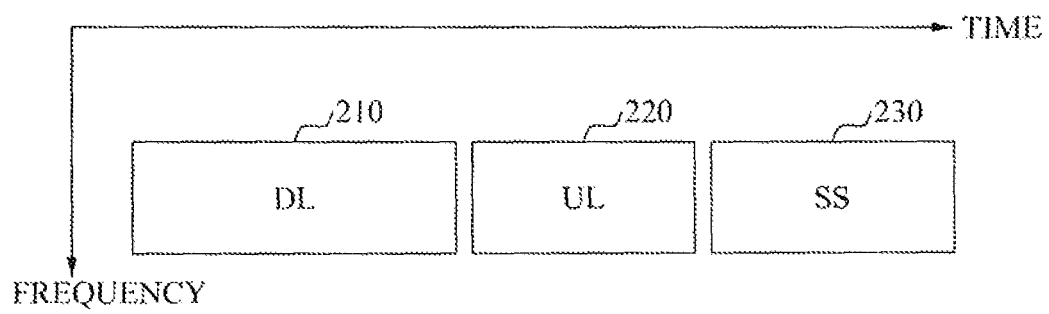
FIGS. 2 to 6 illustrate a terminal communicating with at least one other terminal in a third time section according to embodiments.

Referring to FIG. 2, a terminal according an embodiment performs communication with a base station or another terminal in each of a first time section 210, a second time section 220, and a third time section 230. Hereinafter, the other terminal is a device capable of communicating with the terminal, which includes, for example, at least one other terminal adjacent to the terminal.

In FIGS. 2 to 8, 10 and 11, an x-axis is a time section and a y-axis is a frequency band. As illustrated in the figures, DL denotes a downlink, UP denotes an uplink, and SS denotes terminal-to-terminal, that is, station-to-station.

That is, the terminal may perform communication using substantially the same frequency bands in the first time section 210, the second time section 220, and the third time section 230, respectively.

In particular, the terminal may receive downlink data from the base station in the first time section 210 using a particular frequency band, for example, a frequency band in accordance with IEEE 802.22.

The terminal may transmit uplink data to the base station in the second time section 220 using a frequency band that is substantially the same as the frequency band used in the first time section 210. Here, the second time section 220 is distinguished from the first time section 210.

The terminal may communicate with the other terminal in the third time section 230 using a frequency band substantially the same as the frequency bands used in the first time section 210 and the second time section 220. Here, the third time section 230 is distinguished from the first time section 210 and the second time section 220.

Here, there may be a time gap between the first time section 210 and the second time section 220 to prevent an occurrence of interference due to overlap between the two time sections for different communications.

Likewise, there may be a time gap between the second time section 220 and the third time section 230 to prevent an occurrence of interference due to overlap between the two time sections for different communications.

Figure 3:
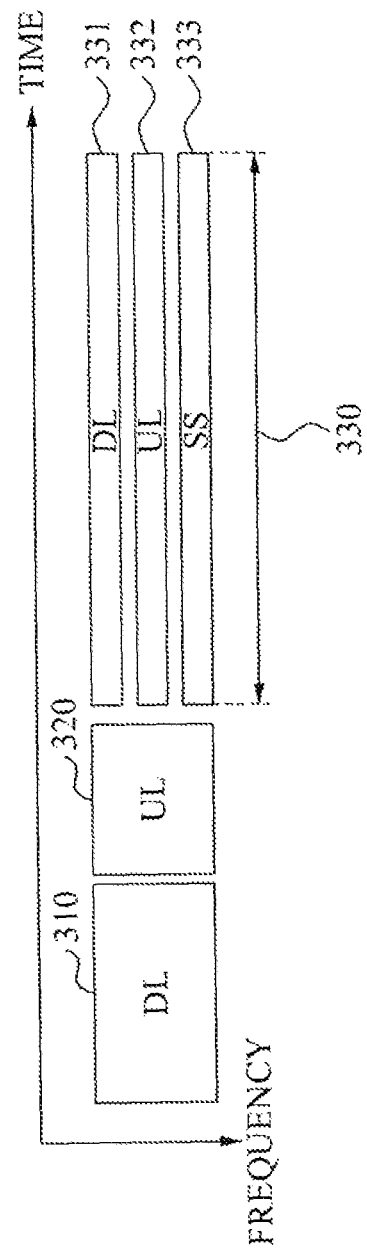

Referring to FIG. 3, a terminal according to an embodiment performs communication with a base station or another terminal in a third time section 330.

The terminal may communicate with the base station using substantially the same frequency bands in a first time section 310 and a second time section 320. Here, operations of the terminal in the first time section 310 and the second time section 320 are the same as those described above with reference to FIG. 2, and thus descriptions thereof will be omitted.

Here, the terminal may communicate with the base station or the other terminal in the third time section 330 using a frequency band that is substantially the same as the frequency bands used in the first time section 310 and the second time section 320.

In detail, the terminal may receive downlink data from the base station using a frequency band 331 in the third time section 330 and transmit uplink data to the base station using a frequency band 332 in the third time section 330. Here, the frequency band 332 is distinguished from the frequency band 331.

Furthermore, the terminal may communicate with the other terminal using a third frequency band 333 in the third time section 330. Here, the frequency band 333 is distinguished from the frequency band 331 and the frequency band 332.

That is, the terminal according to the present embodiment may communicate with the base station or the other terminal using the different frequency bands 331, 332 and 333 in the third time section 330.

Here, the frequency band 331, the frequency band 332, and the frequency band 333 may be included in a frequency band that is substantially the same as the frequency bands used in the first time section 310 and the second time section 320.

In this case, there may be band gaps between the frequency band 331 and the frequency band 332 and between the frequency band 332 and the frequency band 333 to prevent an occurrence of interference due to overlap between two frequency bands for different communications.

As described above with reference to FIG. 2, there may be time gaps between the first time section 310 and the second time section 320 and between the second time section 320 and the third time section 330 to prevent an occurrence of interference due to overlap between two time sections for different communications.

Figure 4:
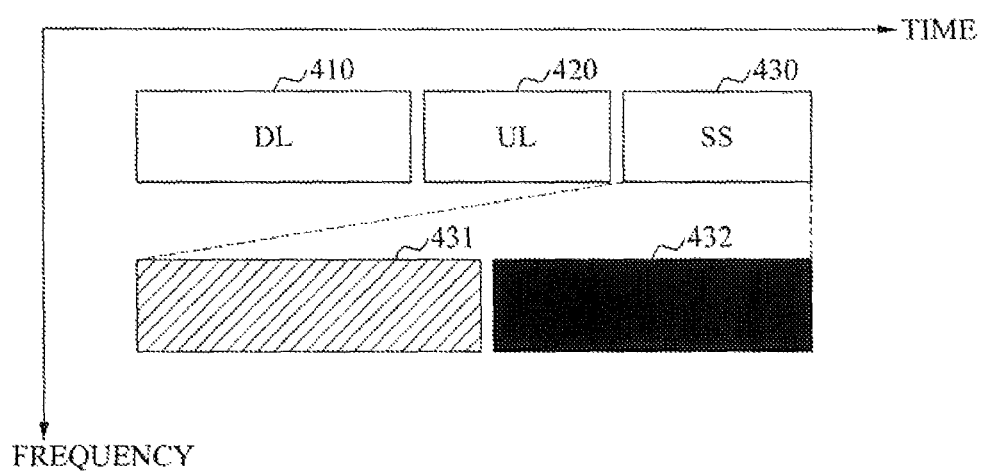

Referring to FIG. 4, a terminal according to an embodiment performs communication with another terminal in a third time section 430.

The terminal may communicate with a base station using substantially the same frequency bands in a first time section 410 and a second time section 420. Here, operations of the terminal in the first time section 410 and the second time section 420 are the same as those described above with reference to FIG. 2, and thus repeated descriptions thereof will be omitted.

Here, the terminal may communicate with the other terminal in the third time section 430 using a frequency band that is substantially the same as the frequency bands used in the first time section 410 and the second time section 420.

In detail, the terminal may receive data from the other terminal in a fourth time section 431 using a frequency band that is substantially the same as the frequency bands used in the first time section 410 and the second time section 420.

Furthermore, the terminal may transmit data to the other terminal in a fifth time section 432 using a frequency band that is substantially the same as the frequency bands used in the first time section 410 and the second time section 420.

That is, the terminal according to the present embodiment may communicate with the other terminal or the base station in the different time sections 431 and 432 included in the third time section 430.

Here, the fifth time section 432 is distinguished from the fourth time section 431, and the fourth time section 431 and the fifth time section 432 are included in the third time section 430.

In this case, there may be time gaps between the first time section 410 and the second time section 420 and between the second time section 420 and the third time section 430 to prevent an occurrence of interference due to overlap between two time sections for different communications. Further, there may be a time gap between the fourth time section 431 and the fifth time section 432 for the same purpose.

Figure 5:
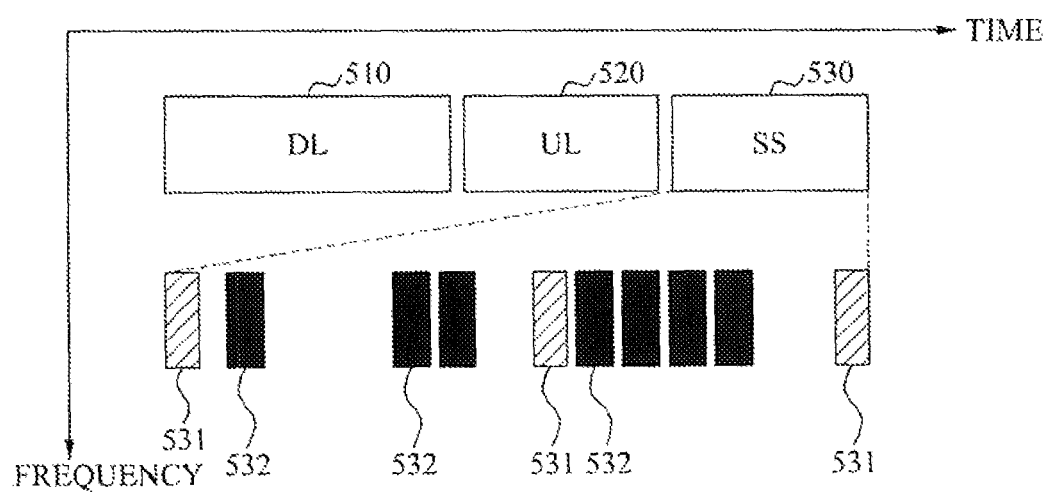

Referring to FIG. 5, a terminal according to an embodiment performs communication with another terminal in a third time section 530.

The terminal may communicate with a base station using substantially the same frequency bands in a first time section 510 and a second time section 520. Here, operations of the terminal in the first time section 510 and the second time section 520 are the same as those described above with reference to FIG. 2, and thus repeated descriptions thereof will be omitted.

Here, the terminal may communicate with the other terminal in the third time section 530 using a frequency band that is substantially the same as the frequency bands used in the first time section 510 and the second time section 520.

In detail, the terminal may communicate with the other terminal in the third time section 530 in a random access mode, for example, carrier sense multiple access-collision avoidance (CSMA-CA), using a frequency band that is substantially the same as the frequency bands used in the first time section 510 and the second time section 520.

For example, the terminal may acquire a channel 532 for transmitting data to the other terminal in the third time section 530 in the random access mode. The terminal may transmit data to the other terminal using the acquired channel 532. Here, the channel 532 acquired by the terminal may be a channel using a frequency band that is substantially the same as the frequency bands used in the first time section 510 and the second time section 520.

Further, the other terminal may acquire a channel 531 for transmitting data to the terminal in the third time section 530 in the random access mode. The other terminal may transmit data to the terminal using the acquired channel 531. In a similar manner, the channel 531 acquired by the other terminal may be a channel using a frequency band substantially the same as the frequency bands used in the first time section 510 and the second time section 520.

Here, the channel 532 acquired by the terminal and the channel 531 acquired by the other terminal are included in the third time section 530. In accordance with the random access mode, the channel 532 acquired by the terminal and the channel 531 acquired by the other terminal may be distinguished from each other.

In this case, there may be time gaps between the first time section 510 and the second time section 520 and between the second time section 520 and the third time section 530 to prevent an occurrence of interference due to overlap between two time sections for different communications. Further, there may be a time gap between the channel 532 acquired by the terminal and the channel 531 acquired by the other terminal for the same purpose.

Figure 6:
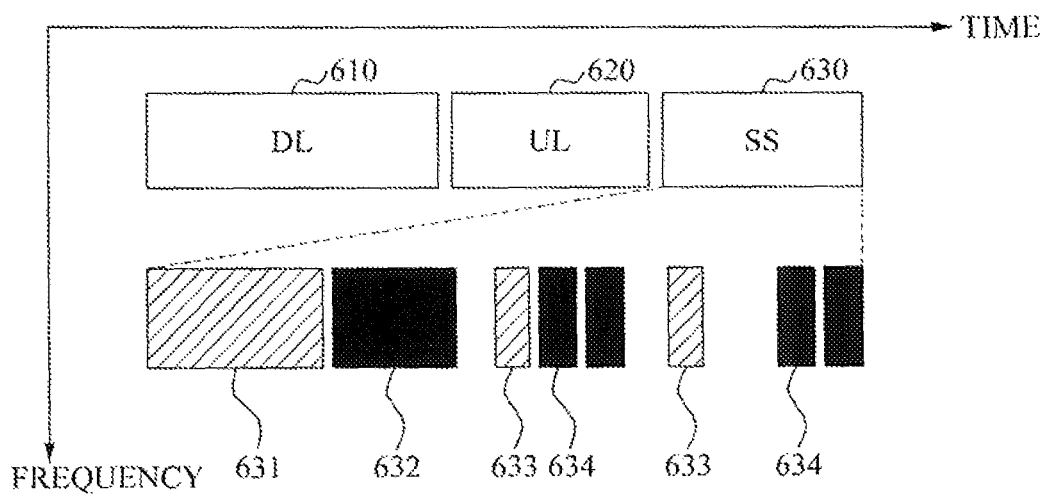

Referring to FIG. 6, a terminal according to an embodiment performs communication with another terminal in a third time section 630.

The terminal may communicate with a base station using substantially the same frequency bands in a first time section 610 and a second time section 620. Here, operations of the terminal in the first time section 610 and the second time section 620 are the same as those described above with reference to FIG. 2, and thus repeated descriptions thereof will be omitted.

Here, the terminal may communicate with the other terminal in the third time section 630 using a frequency band that is substantially the same as the frequency bands used in the first time section 610 and the second time section 620.

In detail, the terminal may communicate with the other terminal in the third time section 630 using the methods described above with reference to FIGS. 4 and 5.

For example, the terminal may receive data from the other terminal in a fourth time section 631 using a frequency band substantially the same as the frequency bands used in the first time section 610 and the second time section 620.

Furthermore, the terminal may transmit data to the other terminal in a fifth time section 632 using a frequency band substantially the same as the frequency bands used in the first time section 610 and the second time section 620.

Here, the fifth time 632 is distinguished from the fourth time section 631, and the fourth time section 631 and the fifth time section 632 are included in the third time section 630.

In addition, the terminal may communicate with the other terminal in a sixth time section in the random access mode, for example, CSMA-CA, using a frequency band substantially the same as the frequency bands used in the first time section 610 and the second time section 620, the sixth time section being included in the third time section 630 but distinguished from the fourth time section 631 and the fifth time section 632.

That is, the terminal may acquire a channel 634 for transmitting data to the other terminal in the sixth time section in the random access mode. The terminal may transmit data to the other terminal using the acquired channel 634. Here, the channel 634 acquired by the terminal may be a channel using a frequency band substantially the same as the frequency bands used in the first time section 610 and the second time section 620.

Further, the other terminal may acquire a channel 633 for transmitting data to the terminal in the sixth time section in the random access mode. The other terminal may transmit data to the terminal using the acquired channel 633. In a similar manner, the channel 633 acquired by the other terminal may be a channel using a frequency band substantially the same as the frequency bands used in the first time section 610 and the second time section 620.

Here, the channel 634 acquired by the terminal and the channel 633 acquired by the other terminal are included in the sixth time section. In accordance with the random access mode, the channel 634 acquired by the terminal and the channel 633 acquired by the other terminal may be distinguished from each other.

In this case, there may be time gaps between the first time section 610 and the second time section 620, between the second time section 620 and the third time section 630, between the fourth time section 631 and the fifth time section 632, and between the fifth time section 632 and the sixth time section to prevent an occurrence of interference due to overlap between two time sections for different communications. Further, there may be a time gap between the channel 634 acquired by the terminal and the channel 633 acquired by the other terminal for the same purpose.

Figure 7:
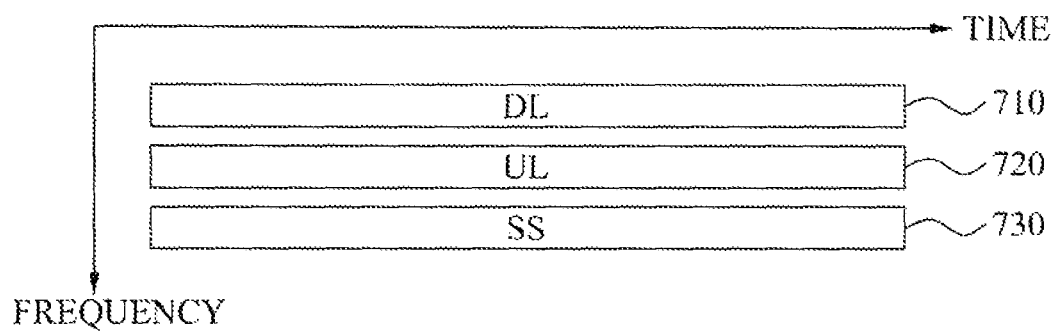
FIGS. 7 and 8 illustrate a terminal communicating with at least one other terminal using a third frequency band according to embodiments.
Figure 8:
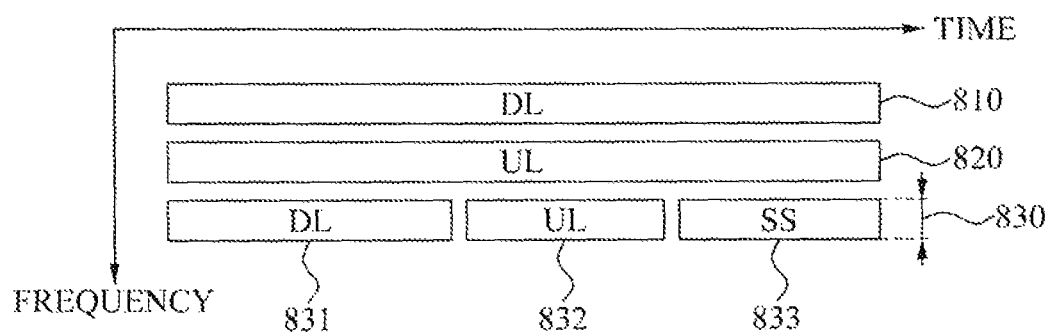

FIGS. 7 and 8 illustrate a terminal communicating with at least one other terminal using a third frequency band according to embodiments.

Referring to FIG. 7, a terminal according to an embodiment performs communication with a base station or another terminal using a first frequency band 710, a second frequency band 720, and a third frequency band 730.

Here, the terminal may communicate with the base station or the other terminal in substantially the same particular time sections using the first frequency band 710, the second frequency band 720, and the third frequency band 730.

In detail, the terminal may receive downlink data from the base station in a particular time section, for example, a time section in accordance with Institute of Electrical and Electronics Engineers (IEEE) 802.22, using the first frequency band 710.

The terminal may transmit uplink data to the base station using the second frequency band 720 in a time section that is substantially the same as the time section with the first frequency band 710. Here, the second frequency band 720 is distinguished from the first frequency band 710.

The terminal may communicate with the other terminal using the third frequency band 730 in a time section substantially the same as the time sections with the first frequency band 710 and the second frequency band 720. Here, the third frequency band 730 is distinguished from the first frequency band 710 and the second frequency band 720.

Here, there may be a band gap between the first frequency band 710 and the second frequency band 720 to prevent interference occurring by overlap between the two frequency bands for different communications.

Similarly, there may be a band gap between the second frequency band 720 and the third frequency band 730 to prevent interference occurring by overlap between the two frequency bands for different communications.

Referring to FIG. 8, a terminal according to an embodiment performs communication with a base station or another terminal using a third frequency band 830.

The terminal may communicate with the base station or the other terminal in substantially the same particular time sections using the first frequency band 810 and the second frequency band 820. Here, operations of the terminal using the first frequency band 810 and the second frequency band 820 are the same as those described above with reference to FIG. 7, and thus descriptions thereof will be omitted.

Here, the terminal may communicate with the base station or the other terminal using the third frequency band 830 in a time section substantially the same as the time sections with the first frequency band 810 and the second frequency band 820.

In detail, the terminal may receive downlink data from the base station in a time section 831 using the third frequency band 830 and transmit uplink data to the base station in a time section 832 using the third frequency band 830. Here, the time section 832 is distinguished from the time section 831.

Further, the terminal may communicate with the other terminal in a time section 833 using the third frequency band 830. Here, the time section 833 is distinguished from the time section 831 and the time section 832.

That is, the terminal according to the present embodiment may communicate with the base station or the other terminal using the third frequency band 830 in the different time sections 831, 832 and 833.

Here, the time section 831, the time section 832 and the time section 833 may be included in a time section that is substantially the same as those using the first frequency band 810 and the second frequency band 820.

In this case, there may be time gaps between the time section 831 and the time section 832 and between the time section 832 and the time section 833 to prevent an occurrence of interference due to overlap between two frequency bands for different communications.

As described above with reference to FIG. 7, there may be band gaps between the first frequency band 810 and the second frequency band 820 and between the second frequency band 820 and the third frequency band 830 to prevent interference occurring by overlap between two time sections for different communications.

It should be apparent to those skilled in the art that the details described with reference to FIGS. 4 to 6 may be easily applied to when the third frequency band 830 is used in the time section 833.

Figure 9:
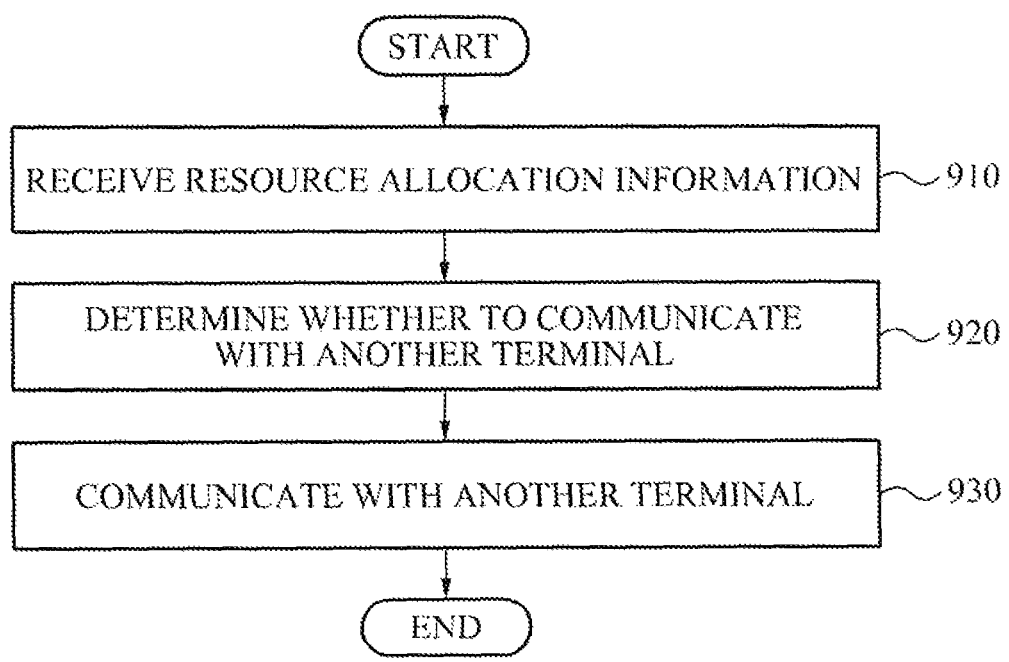
FIGS. 9 to 11 illustrate a method of a terminal being allocated a resource for communication with another terminal based on traffic between a plurality of terminals according to embodiments.
Figure 10:
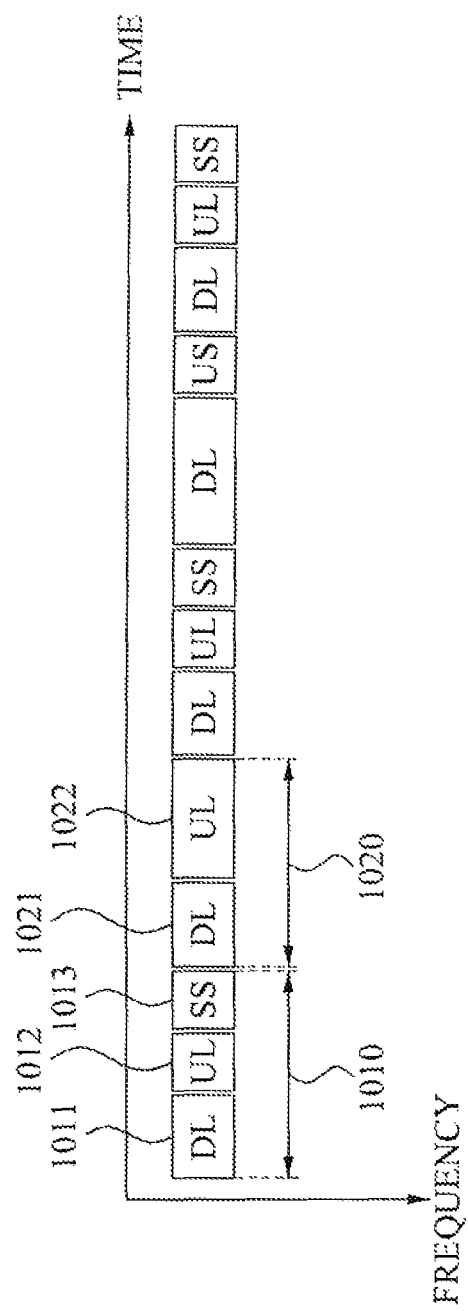
Figure 11:
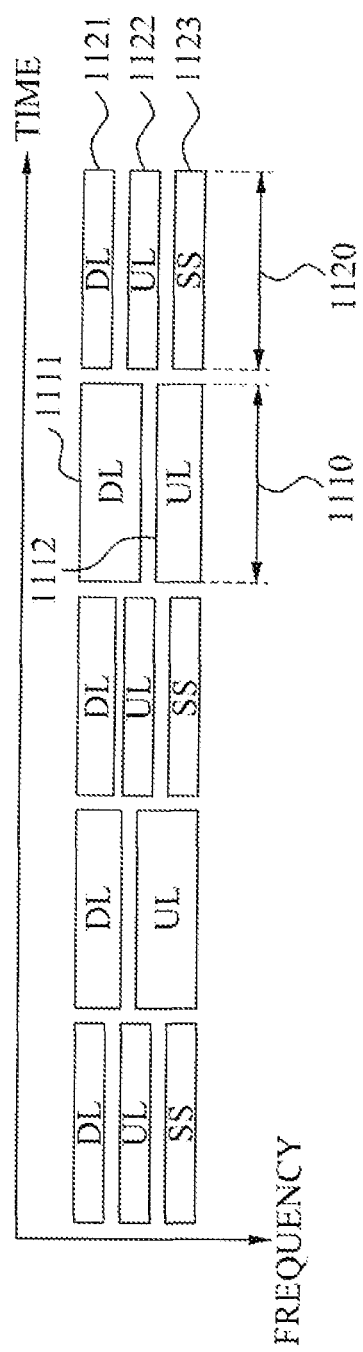

FIGS. 9 to 11 illustrate a method of a terminal being allocated a resource for communication with another terminal based on traffic between a plurality of terminals according to embodiments.

Referring to FIG. 9, a terminal according to an embodiment may receive resource allocation information for communication with another terminal from a base station in operation 910, determine whether to communicate with the other terminal based on the received resource allocation information in operation 920, and communicate with the base station or the other terminal based on the received resource allocation information and a determination result in operation 930.

Here, the base station may acquire information about traffic between a plurality of terminals and determine whether to allocate a resource for terminal-to-terminal communication based on the acquired traffic information. The base station may generate resource application information based on a determination result.

For example, when the traffic between the plurality of terminals is determined to be less than a predetermined threshold value, the base station may not allocate a resource for terminal-to-terminal communication. In this case, the base station may generate resource allocation information including only a resource for base station-to-terminal communication, that is, a resource for uplink communication and a resource for downlink communication.

Referring to FIGS. 10 and 11, a terminal according to an embodiment acquires resource allocation information including only resources 1021 and 1111 for receiving downlink data from the base station and resources 1022 and 1112 for transmitting uplink data to the base station in time sections 1020 and 1110.

Here, the resource 1021 for receiving downlink data from the base station and the resource 1022 for transmitting uplink data to the base station may be sub-time sections included in the time section 1020.

Further, the resource 1111 for receiving downlink data from the base station and the resource 1112 for transmitting uplink data to the base station may be sub-frequency bands included in a particular frequency band used in the time section 1110.

In this instance, when the traffic between the plurality of terminals is determined to be greater than the predetermined threshold value, the base station may allocate a resource for terminal-to-terminal communication. In this case, the base station may generate resource allocation information including not only a resource for base station-to-terminal communication but also a resource for terminal-to-terminal communication.

Referring to FIGS. 10 and 11, a terminal according to an embodiment acquires resource allocation information including resources 1011 and 1121 for receiving downlink data from the base station, resources 1012 and 1122 for transmitting uplink data to the base station, and resources 1013 and 1123 for terminal-to-terminal communication in time sections 1010 and 1120.

Here, the resource 1011 for receiving downlink data from the base station, the resource 1012 for transmitting uplink data to the base station, and the resource 1013 for terminal-to-terminal communication may be sub-time sections included in the time section 1010.

Here, it should be apparent to those skilled in the art that the details described with reference to FIGS. 2 to 6 may be easily applied in the time section 1013.

Further, the resource 1121 for receiving downlink data from the base station, the resource 1122 for transmitting uplink data to the base station, the resource 1123 for terminal-to-terminal communication may be sub-frequency bands included in a particular frequency band used in the time section 1120.

Here, it should be apparent to those skilled in the art that the details described with reference to FIGS. 7 and 8 may be easily applied to when the frequency band 1123 is used in the time section 1120.

As described above, in the infrastructure network, the terminal may communicate with the base station or the other terminal based on the resource allocation information transmitted from the base station.

Figure 12:
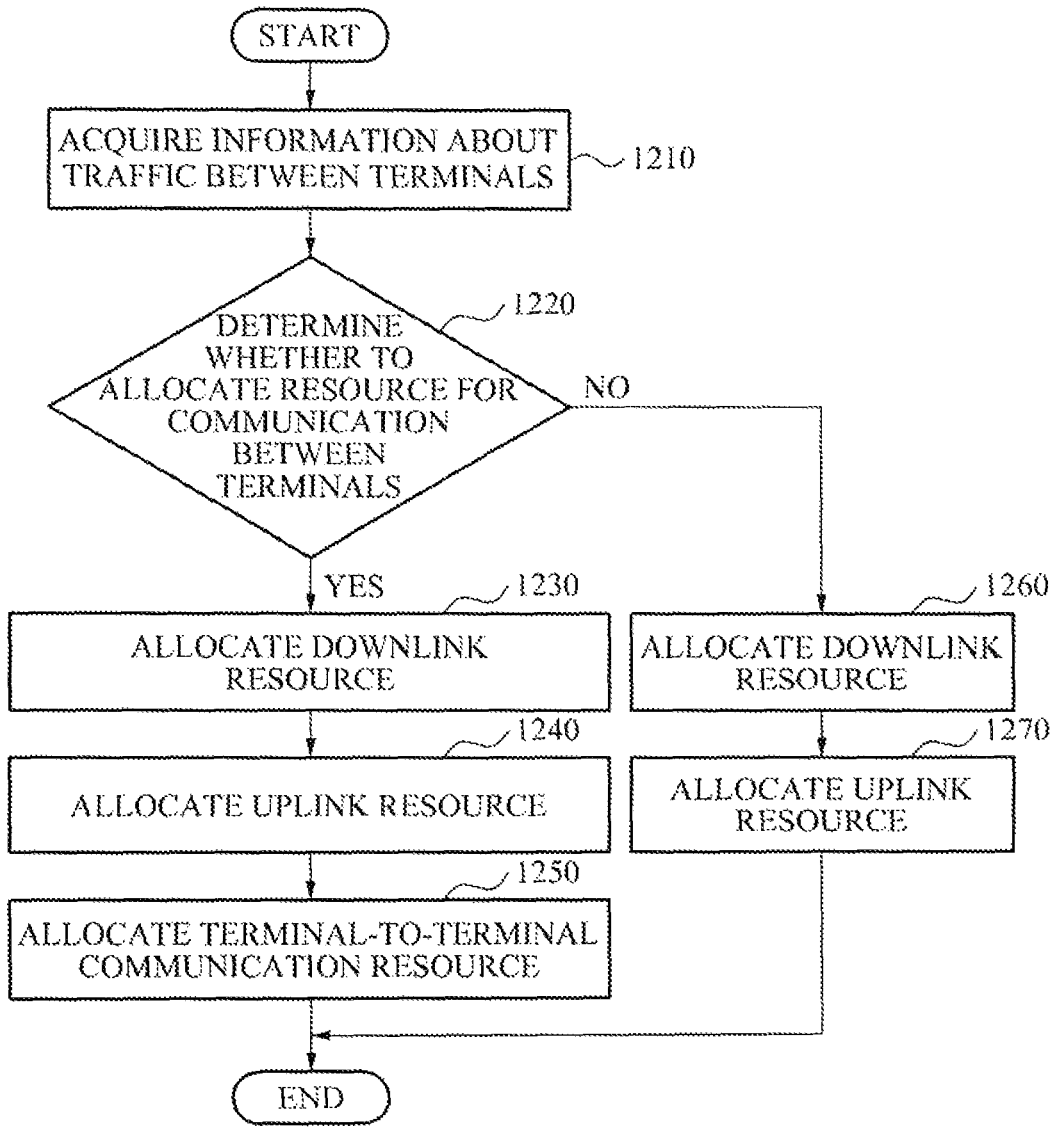
FIG. 12 is a flowchart illustrating a base station allocating a terminal-to-terminal communication resource based on traffic between a plurality of terminals according to an embodiment.

FIG. 12 is a flowchart illustrating a base station allocating a terminal-to-terminal communication resource based on traffic between a plurality of terminals according to an embodiment.

Referring to FIG. 12, the base station according to the present embodiment may allocate a downlink resource for downlink communication from the base station to at least one terminal among the plurality of terminals in a super frame in operation 1230, allocate an uplink resource for uplink communication from the at least one terminal among the plurality of terminals to the base station in the super frame in operation 1240, and allocate a terminal-to-terminal communication resource for communication between the plurality of terminals in the super frame in operation 1250.

Here, one super frame may include a downlink resource, an uplink resource, and a terminal-to-terminal communication resource.

Further, a base station according to another embodiment may acquire information about traffic between the plurality of terminals in operation 1210 and determine whether to allocate a terminal-to-terminal communication resource based on the traffic information in operation 1220.

In this case, the base station may allocate a downlink resource for downlink communication from the base station to at least one terminal among the plurality of terminals in a super frame in operation 1260 and allocate an uplink resource for uplink communication from the at least one terminal among the plurality of terminals to the base station in the super frame in operation 1270.

That is, the base station may not allocate a terminal-to-terminal communication resource for communication between the plurality of terminals in the super frame based on determination not to allocate a terminal-to-terminal communication resource.

The details described with reference to FIGS. 1 to 11 may be easily applied to the operations shown in FIG. 12, and thus detailed descriptions of the operations will be omitted.

The methods according to the embodiments may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the embodiments, or vice versa.

Although a few embodiments have been shown and described with reference to the accompanying drawings, it would be appreciated by those skilled in the art that various modifications and variations may be made to these embodiments. For example, the foregoing technologies may be carried out in different orders from as described above and/or the aforementioned components, such as systems, structures, devices and circuits, may be combined or united in different forms from as described above or be substituted or replaced with other elements or equivalents, and accordingly appropriate result may be achieved.

Therefore, other examples and embodiments are defined to be within the scope of the claims and their equivalents.

The invention claimed is:

1. A communication method of a terminal for communication between a plurality of terminals in an infrastructure network comprising a base station and the plurality of terminals, the communication method comprising:
   receiving a downlink data from the base station using a particular frequency band in a first time section;
   transmitting an uplink data to the base station using the particular frequency band in a second time section distinguished from the first time section; and
   communicating with at least one other terminal using the particular frequency band in a third time section distinguished from the first time section and the second time section,
   wherein the terminal is positioned within a communication range of the base station and the at least one other terminal is positioned outside the communication range of the base station;
   wherein the first time section precedes the second time section, and the second time section precedes the third time section; and
   wherein the third time section is separately designated for a special purpose other than uplink or downlink data to and from a base station.

2. The communication method of claim 1, wherein the communicating with the at least one other terminal comprises communicating with the base station in the third time section using a first frequency band, and communicating with the at least one other terminal in the third time section using a second frequency band distinguished from the first frequency band, and the particular frequency band comprises the first frequency band and the second frequency band.

3. The communication method of claim 1, wherein the communicating with the at least one other terminal comprises receiving data from the at least one other terminal using the particular frequency band in a predetermined fourth time section, and transmitting data to the at least one other terminal using the particular frequency band in a predetermined fifth time section, and the third time section comprises the fourth time section and the fifth time section, and the fifth time section is distinguished from the fourth time section.

4. The communication method of claim 1, wherein the communicating with the at least one other terminal comprises communicating with the at least one other terminal using the particular frequency band in the third time section in a random access mode.

5. The communication method of claim 1, wherein the communicating with the at least one other terminal comprises receiving data from the at least one other terminal using the particular frequency band in a predetermined fourth time section, transmitting data to the at least one other terminal using the particular frequency band in a predetermined fifth time section, and communicating with the at least one other terminal using the particular frequency band in a predetermined sixth time section in a random access mode,
   the third time section comprises the fourth time section, the fifth time section, and the sixth time section,
   the fifth time section is distinguished from the fourth time section, and
   the sixth time section is distinguished from the fourth time section and the fifth time section.

6. A communication method of a terminal for communication between a plurality of terminals in an infrastructure network comprising a base station and the plurality of terminals, the communication method comprising:
   receiving resource allocation information for communication with at least one other terminal from the base station;
   determining whether to communicate with the at least one terminal based on the resource allocation information; and
   communicating with the base station or the at least one terminal based on the resource allocation information and a determination result,
   wherein the resource allocation information comprises:
      information about a first time section for reception of downlink data from the base station using a particular frequency band;
      information about a second time section for transmission of uplink data to the base station using the particular frequency band, the second time section being distinguished from the first time section; and
      information about a third time section for communication with the at least one terminal using the particular frequency band, the third time section being distinguished from the first time section and the second time section,
   wherein the terminal is positioned within a communication range of the base station and the at least one other terminal is positioned outside the communication range of the base station;

wherein the first time section precedes the second time section, and the second time section precedes the third time section; and wherein the third time section is separately designated for a special purpose other than uplink or downlink data to and from a base station.

7. The communication method of claim 6, wherein the information about the third time section comprises information about a first frequency band for communication with the base station in the third time section, the first frequency band being included in the particular frequency band; and information about a second frequency band for communication with the at least one terminal in the third time section, the second frequency band being included in the particular frequency band and distinguished from the first frequency band.

* * * * *